(12) United States Patent
Sampica et al.

(10) Patent No.: US 7,307,805 B1
(45) Date of Patent: Dec. 11, 2007

(54) FLEXIBLE NVIS FILTER

(75) Inventors: James D. Sampica, Springville, IA (US); Albert N. Stuppi, Springville, IA (US); Tracy J. Barnidge, Swisher, IA (US); Sandra S. Dudley, Walker, IA (US); Gary N. Prior, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 288 days.

(21) Appl. No.: 11/112,258

(22) Filed: Apr. 21, 2005

(51) Int. Cl.
*G02B 5/22* (2006.01)
(52) U.S. Cl. .................. 359/900; 359/892; 359/353
(58) Field of Classification Search ............. 359/350, 359/353, 885, 886, 892
See application file for complete search history.

(56) References Cited

U.S. PATENT DOCUMENTS

| | | | |
|---|---|---|---|
| 5,521,759 A * | 5/1996 | Dobrowolski et al. | 359/585 |
| 5,661,578 A * | 8/1997 | Habing et al. | 349/65 |
| 6,639,349 B1 * | 10/2003 | Bahadur | 313/483 |
| 6,714,186 B1 * | 3/2004 | Mosier et al. | 345/104 |
| 2004/0179283 A1 | 9/2004 | Jones et al. | 359/885 |
| 2004/0181006 A1 * | 9/2004 | Warren et al. | 524/556 |

FOREIGN PATENT DOCUMENTS

WO        WO 9414089 A1 *  6/1994

OTHER PUBLICATIONS

Rankowski, John F., "Absorptive Bandpass Filters for NVIS Compatible Crewstations," Proc. of SPIE, vol. 2622, pp. 38-47, (1995).*
"Nightshield NV-Flex™ from Korry Electronics", Korry Electronics, Seattle, Washington [online], [retrieved on Mar. 11, 2005]. Retrieved from the Internet: <URL: http://www.korry.com/PDF/Korry_NV_Flex.pdf>.

* cited by examiner

*Primary Examiner*—Alessandro Amari
*Assistant Examiner*—Mark Consilvio
(74) *Attorney, Agent, or Firm*—Kyle Eppele; Nathan O. Jensen

(57) ABSTRACT

A flexible filter for use in filtering wavelengths of light that interfere with night vision awareness systems is disclosed. A filtering material is applied to a first flexible film in a substantially liquid form and is cured thereto using ultraviolet light. The filtering material filters wavelengths of light between about 610 and 930 nanometers when cured. A second flexible film is temporarily held in place by a support member. The second flexible film is applied to the cured filtering material and is fused thereto using a combination of increased temperature and pressure for a predetermined time. The first and second flexible films are made of polyurethane.

5 Claims, 6 Drawing Sheets

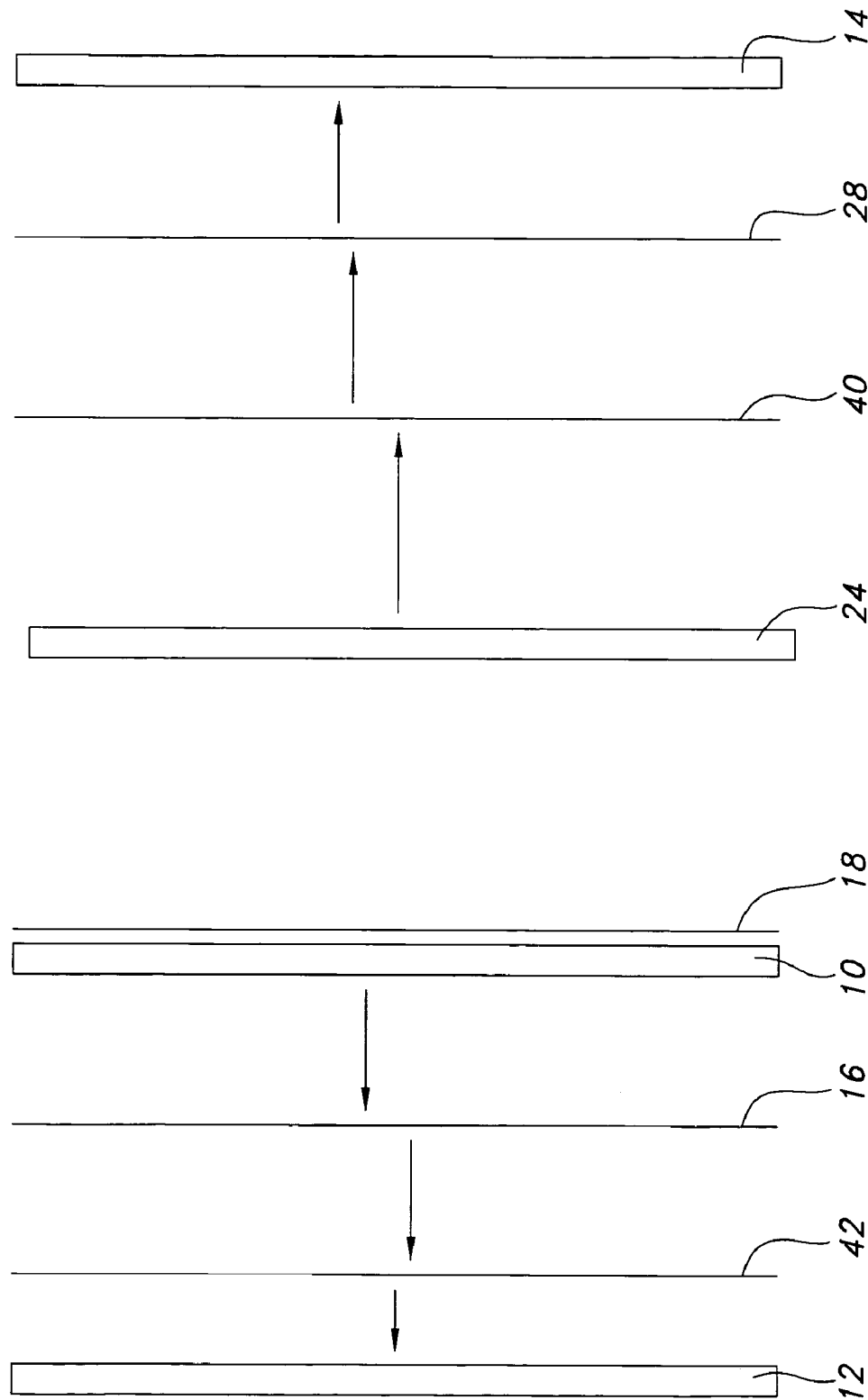

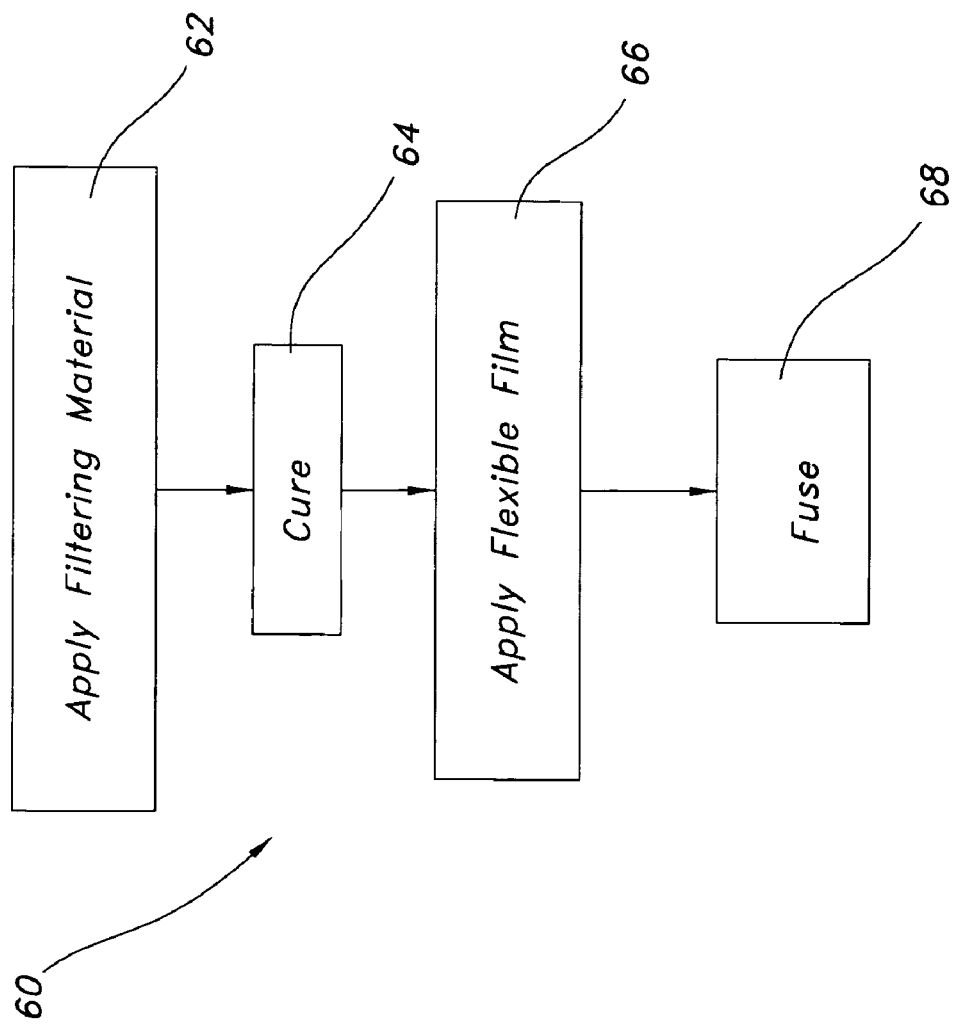

FLEXIBLE NVIS FILTER

FIELD OF THE INVENTION

The invention relates to displays, and more particularly, to filters that filter out or attenuate light having wavelengths that interfere with night vision (NVIS) systems.

BACKGROUND OF THE INVENTION

Night vision imaging (NVIS) systems provide improved vision and situational awareness in low ambient light conditions to a viewer such as an aircraft pilot. A night vision imaging system allows the pilot or operator to use night vision imaging goggles while flying the aircraft. Night vision imaging goggles are sensitive to light primarily in the red to near-infrared wavelengths, approximately 610 nanometers (nm) to 930 nm in the electromagnetic spectrum (the near-infrared spectrum). Night vision imaging goggles allow the pilot to view outside conditions in low light using light in the near-IR spectrum, allowing aircraft operation during nighttime conditions.

It is important to ensure that avionics display systems provided in an aircraft are compatible with the use of night vision imaging goggles. If the light from an avionics display is within the near-IR spectrum and therefore viewable by the night vision goggles, the light from the display can be seen reflecting off the aircraft canopy, degrading goggle performance and pilot vision. Incompatible lights make the outside scene less visible with the goggles. Additionally, changing illumination can affect visual acuity.

One method of controlling this problem is to apply a filter to any display to be used during NVIS operation. The filter substantially reduces the transmission of light having wavelengths in the near-IR spectrum. Using such a filter, an emissive display can be used during night vision operations.

To save space and increase viewability, NVIS filters should be conformal to the displays with which they are used. A non-planar or a flexible display, such as a display relying on emissive organic light-emitting diodes (OLEDs) or a panoramic rear projection display, requires a correspondingly flexible NVIS filter if the display is to be used in NVIS applications. Although there is a need for a flexible, robust NVIS filter that can be used with flexible or non-planar displays, such filters do not currently exist.

It is therefore an object of the invention to provide a flexible NVIS filter that may be used with flexible or non-planar display technologies.

It is also an object of the invention to provide a flexible NVIS filter that can be easily and efficiently manufactured.

A feature of the invention is a flexible NVIS filter having a UV-curable filtering material disposed between flexible substrates or films.

An advantage of the invention is a fully or partially flexible NVIS filter usable with non-planar or flexible display technologies.

SUMMARY OF THE INVENTION

The invention provides a flexible filter for use in filtering wavelengths of light that interfere with night vision awareness systems. A filtering material is applied to a first flexible film in a substantially liquid form and is cured thereto using ultraviolet light. The filtering material filters wavelengths of light between about 610 and 930 nanometers (nm) when cured. A second flexible film is temporarily held in place by a support member. The second flexible film is applied to the cured filtering material and is bonded thereto using a combination of increased temperature and pressure for a predetermined time. The first and second flexible films are made of polyurethane.

The invention also provides a method of manufacturing a flexible night vision imaging system (NVIS) filter. According to the method, an NVIS filtering material is applied to a surface of a first flexible polyurethane film. The filtering material is cured using ultraviolet light. A second flexible polyurethane film is applied to the cured filtering material. The filtering material and the first flexible film are bonded together such that the filtering material is between the first and second flexible films.

The invention further provides a flexible NVIS filter. First flexible film means are provided. Means for filtering wavelengths of light between about 610 and 930 nanometers are applied in a substantially liquid form to the first flexible film means. The means for filtering is cured to the first optical means using ultraviolet light. Second flexible film means are applied to the cured means for filtering. The second flexible film means is temporarily attached to a support means while being bonded to the means for filtering, the fusing being accomplished using a combination of increased temperature and pressure for a predetermined time.

BRIEF DESCRIPTION OF THE DRAWINGS

FIG. 6 is a schematic diagram of another alternate manufacturing process according to the invention.

FIG. 7 is a flowchart of a method of manufacturing the invented NVIS flexible filter.

DETAILED DESCRIPTION OF THE DRAWINGS

Figure 1:
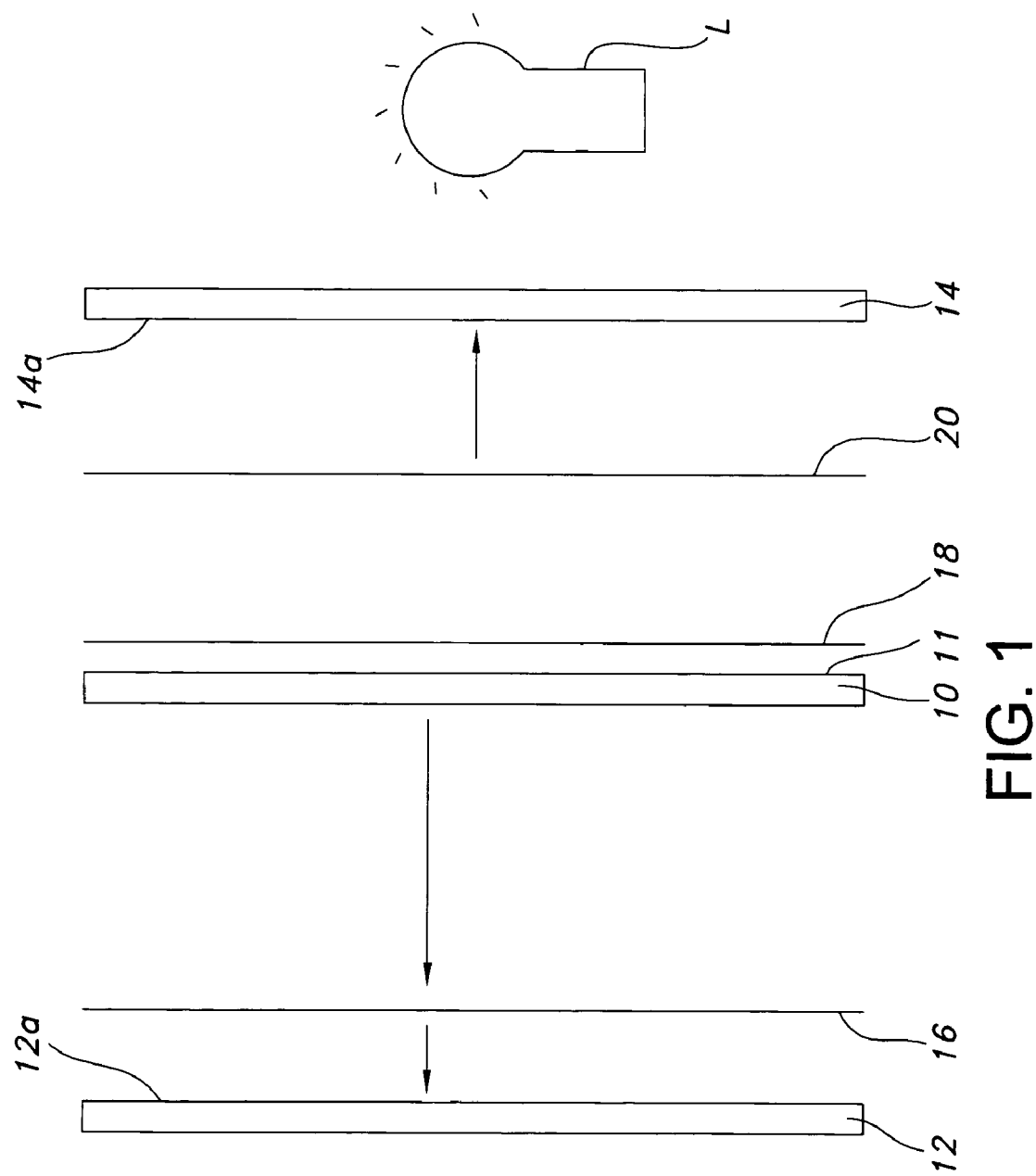
FIG. 1 is a schematic diagram of a portion of a manufacturing process for the invented flexible NVIS filter.
Figure 2:
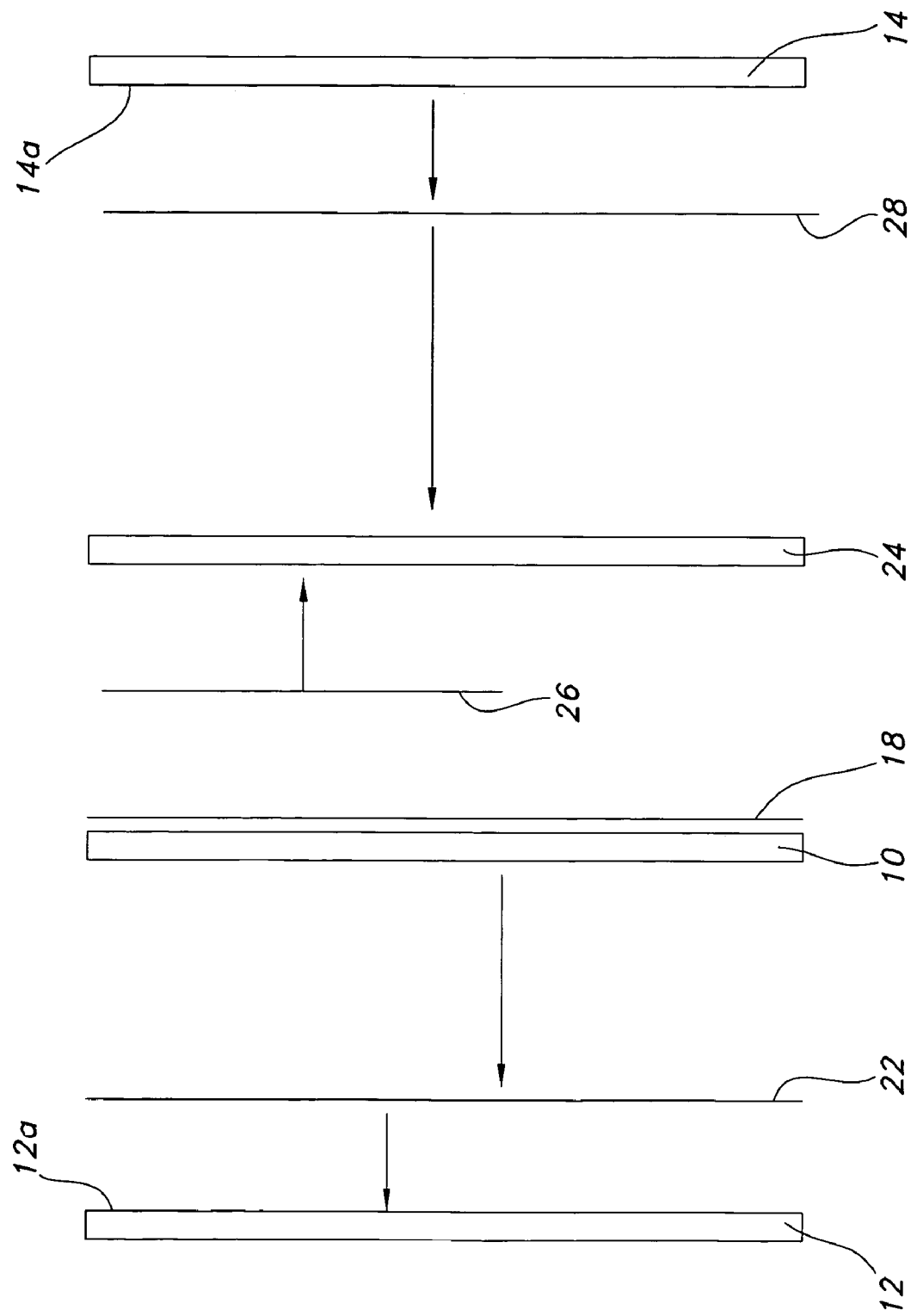
FIG. 2 is a schematic diagram of another portion of the manufacturing process for the invented flexible NVIS filter.
Figure 3:
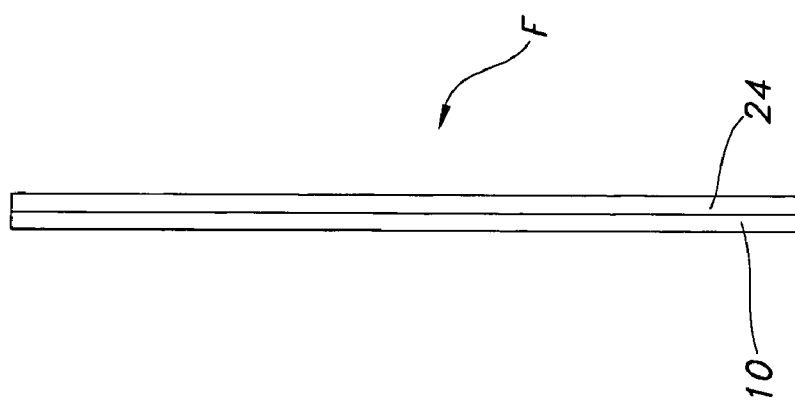
FIG. 3 is a side elevational view of the invented flexible NVIS filter.

FIGS. 1-3 depict the several steps of making a flexible NVIS filter according to a preferred embodiment of the invention. FIG. 1 shows first and second temporary support structures 12, 14. Each of the first and second temporary support structures includes a rigid, planar face 12a, 14a that is used to maintain a planar shape of the flexible NVIS filter during manufacturing. In a preferred embodiment first and second temporary support structures 12, 14 are made of glass, with at least second temporary support structure 14 being substantially transparent to ultraviolet light. A temporary adhesive 16 is applied to face 12a of first temporary support structure 12, and a first flexible element 10 is thereby secured to first temporary support structure 12. First flexible element 10 is substantially transparent and is preferably made of a thermoplastic material such as a polyurethane film. Polyurethane is preferred because of its ease of handling, its low cost, its transparent optical properties, and its suitability to the processes described herein.

A filtering material 18 is applied to a surface 11 of first flexible element 10. Filtering material 18 is a liquid or colloidal substance containing a composition that, when fully processed as described herein, filters light having wavelengths within the near-IR spectrum, i.e. between about 610 to 930 nanometers (nm) Filtering material 18 may be, for example, one of the compounds described in U.S. Patent Application Publication No. 2004/0179283, the disclosure of which is incorporated by reference in its entirety herein. Other compositions may be used as well, provided said compositions have the desired light-filtering characteristics as described in the present application. Filtering material 18 also includes a photopolymer that solidifies or cures the filtering material when subjected to specific wavelengths of light. Once filtering material 18 is applied to surface 11, second temporary support structure 14 is applied against first flexible element 10. Preferably a first liner 20 is applied to face 14a to be positioned between face 14a and filtering material 18. First liner 20 is a substantially transparent film made of a polymer such as polyethylene or polyester and may have a temporary adhesive applied thereto to keep the first liner attached to face 14a. Temporary shims 21 are placed between first liner 20 and surface 11 to provide a gap within which the filtering material may evenly spread along surface 11 and stabilize. A small amount of pressure is applied to one or both of the temporary support structures. When the filtering material has stabilized and has spread along surface 11, the temporary shims and the small amount of pressure are removed. A light source L shines light having wavelengths to which the photopolymer in filtering material is sensitive, which in a preferred embodiment is ultraviolet light having wavelengths of approximately 365 nm. When filtering material 18 has been sufficiently cured by light from light source L such that the filtering material is bonded to first flexible element 10 and is no longer in a liquid state, first flexible element 10 is removed from between first and second temporary support structures 12, 14. Temporary adhesive 16 and first liner 20 are either removed from the first and second temporary support structures, respectively, or are kept on the temporary support structures for use during subsequent manufacturing steps.

Figure 4:
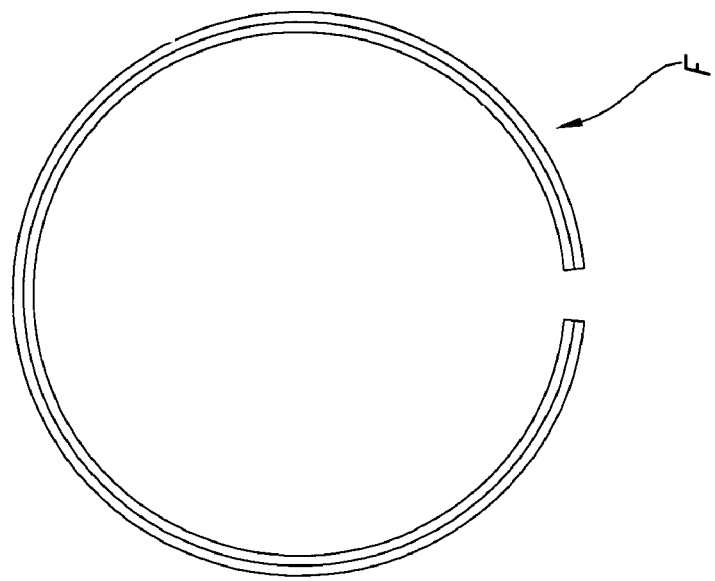
FIG. 4 is another side elevational view of the invented flexible NVIS filter.

Now turning to FIG. 2, a second liner 22 is placed on face 12a of first temporary support structure 12. First flexible element 10, now having cured filtering material 18 applied on one of its surfaces, is placed against second liner 22. A second flexible element 24 is placed against cured filtering material 18, and may be kept in contact with the cured filtering material using a pressure-sensitive adhesive layer 26. Such pressure-sensitive adhesive layer is especially beneficial when the NVIS filter is to be used in severe environments. Second flexible element 24 is a substantially transparent material such as polyurethane film, and preferably is made of the same material as first flexible element 10. A third liner 28 is placed on face 14a of second temporary support structure 14, and the first and second flexible elements are pressed between the first and second temporary support structures using a fixture (not shown) and heated to bond together the first and second flexible elements. For the materials mentioned herein, it has been found that a satisfactory bond is created using the following sequence: (1) applying a pressure of 30 pounds per square inch (psi) at 80 degrees Celsius for at least 15 minutes; (2) steadily increasing the pressure and temperature to 50 psi and 90 degrees Celsius, respectively, and maintaining such pressure and temperature levels for at least 15 minutes; (3) steadily increasing the temperature to 100 degrees Celsius, and maintaining such temperature level (as well as holding the pressure at 50 psi) for at least 15 minutes; and (4) removing the assembly from pressure and baking the assembly at 80 degrees Celsius for about 30 minutes. Such a sequence of pressure and temperature levels bonds or fuses second flexible element 24 to the cured filtering material such that the cured filtering material is disposed between the first and second flexible elements 10, 24, thereby forming a flexible NVIS filter according to the invention. Said levels of pressure and temperature also makes the first and second flexible elements optically clear. The finished filter is removed from between the first and second temporary support structures, and the second and third liners are removed from the faces 12a, 14a of the support structures. Second and third liners 22, 28 are preferably made of a polymer such as polyester and function to ensure the first and second flexible elements can be separated from the first and second temporary support structures, respectively, after the bonding procedure has been completed. The second and third liners may not be necessary if the temporary adhesive and the first liner are still usable and are applied to the first and second temporary support structures, respectively. The finished NVIS filter F is shown in FIG. 3. It can be seen that cured filtering material 18 is protected on either side by a flexible, substantially transparent film, which is the bonded-together combination of first and second flexible elements 10, 24. Because NVIS filter F is made of layers of thin, flexible polyurethane films, the NVIS filter is so flexible it can be spooled or rolled into itself, as shown in FIG. 4.

Figure 5:
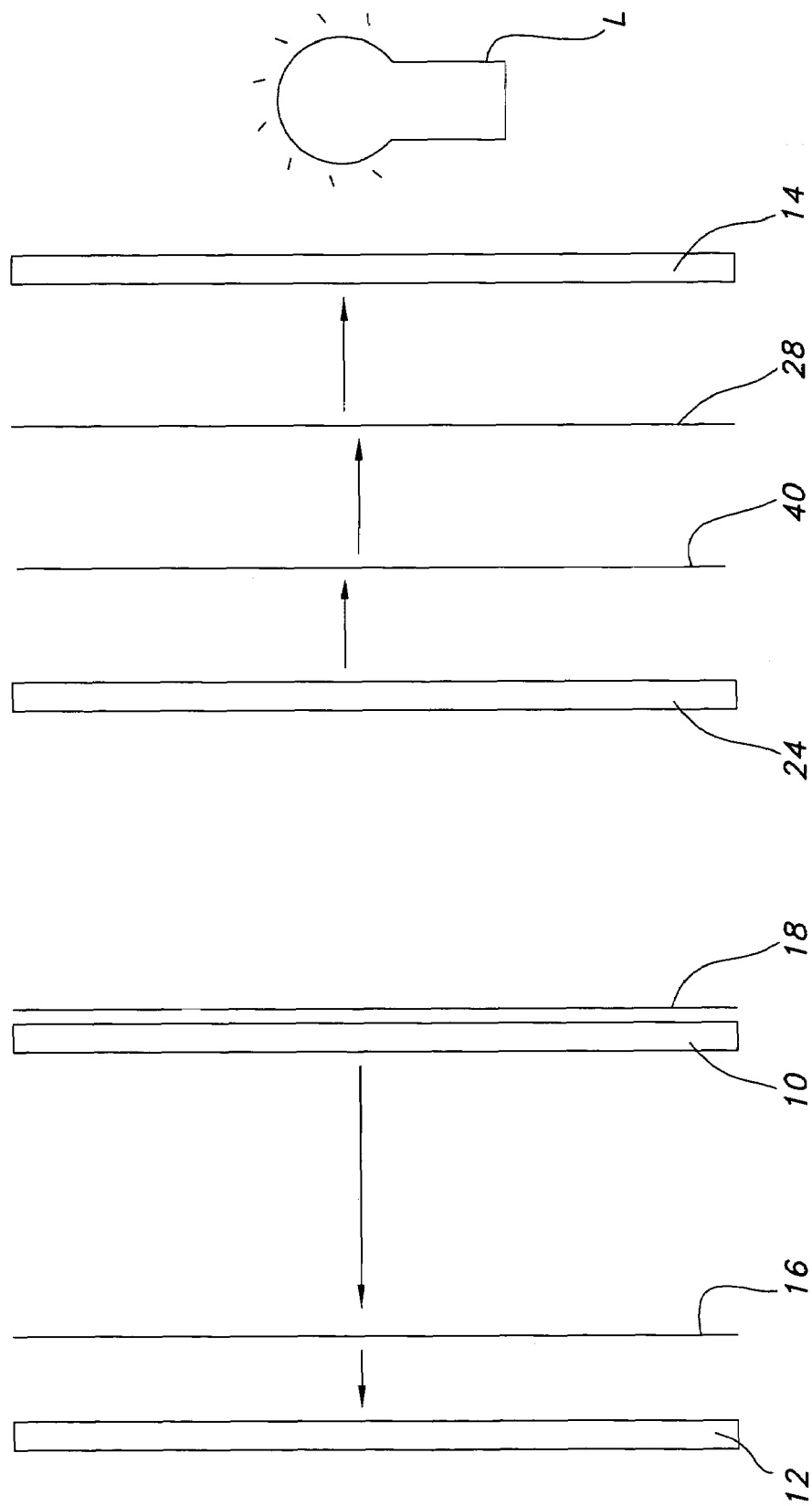
FIG. 5 is a schematic diagram of an alternate manufacturing process according to the invention.

It should be understood that the process herein outlined may be varied by adding, subtracting, re-arranging or substituting process steps while keeping with the spirit of the described invention. For example, the precise times, temperatures, and pressures disclosed in the preceding paragraph for the fusing or bonding process may be varied as desired, provided an adequate bond is created. In addition, the temporary support structures used during the Ultraviolet light curing process (as shown in FIG. 1) may be different from the temporary support structures used during the pressure/temperature bonding or fusing process (as shown in FIG. 2). Also, as shown in FIG. 5, second flexible element 24 may be placed upon uncured filtering material 18 prior to the UV curing process. An additional layer of temporary adhesive 40 is placed between second flexible element 24 and third liner 28 to attach the second flexible element thereto. As with the embodiment shown in FIG. 1, first flexible element 10 is attached to first temporary support structure 12 using a temporary adhesive 16. First and second temporary support structures 12, 14 are placed together, and the filtering material is cured using light source L as previously disclosed. Once the filtering material is sufficiently cured, the first and second flexible elements 10, 24 are placed into a fixture to be bonded or fused together using a combination of temperature and pressure conditions such as what has been described above. If necessary, to aid in maintaining flatness, uniformity of bonding, and ease of removal of the finished NVIS filter, an additional polyethylene or polyester liner 42 may be applied between temporary adhesive 16 and first temporary support structure 12, as shown in FIG. 6. The process shown in FIG. 6 is otherwise the same as what is shown in FIG. 5.

FIG. 7 is a flowchart showing a method 60 of manufacturing a flexible NVIS filter according to the invention. In step 62 an optical element, such as, a fully flexible film or a semi-flexible optical substrate, has a filtering material applied thereto in a substantially liquid form (i.e., liquid or colloidal form). The filtering material, when cured, is operative to filter light in the night vision spectrum, i.e., between about 610 and 930 nm. If the optical element is fully flexible it has previously been adhered to a temporary support structure using a temporary adhesive. In step 64 the filtering material is cured using ultraviolet light. In step 66 another flexible film is applied to the surface of the cured filtering material, which is now in a substantially solid form upon a surface of the optical element. In step 68 the optical element and the flexible film are fused or bonded together, using a combination of increased temperatures and pressures as disclosed herein, such that the filtering material is disposed between the optical element and the flexible film.

The Figures show side or edge views of various layers used in the manufacture of the invented NVIS filter. The relative thicknesses of the layers as drawn are for convenience in explaining the invention and are not to scale. Said relative thicknesses as drawn should not be construed as limiting the scope of the disclosed invention.

The invention as described herein provides a flexible, rollable, robust NVIS filter that may be used to attenuate the light emitted from avionics displays in an aircraft. The invented NVIS filter may also be used in other applications, such as ground vehicle or handheld devices such as handheld navigation displays (GPS) for military or commercial applications. An advantage of the invention is that its flexibility makes it compatible with non-planar or flexible display technologies, such as emissive organic light-emitting diode (OLED) displays.

Another advantage is that the invented NVIS filter is efficiently manufactured. The process and materials described herein are conducive to large economies of scale in which a single large filter is manufactured and cut to size according to the desired application.

Still another advantage is that the filtering material is placed between flexible or semi-flexible layers to provide protection thereto.

Yet another advantage is that the invented NVIS filter can be combined with other NVIS filtering technology. For example, a secondary NVIS filtering material can be applied or coated on a surface of the NVS filter.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of manufacturing a flexible night vision imaging system filter, comprising:

applying a filtering material to a surface of a first flexible polyurethane film, said filtering material filtering light having wavelengths between about 610 and 930 nanometers when cured;

curing the filtering material using ultraviolet light, wherein the filtering material is cured while the first flexible polyurethane film is held between first and second temporary support structures, and further wherein the first flexible film is temporarily adhered to one of the first and second temporary support structures while the filtering material is being cured;

applying a second flexible polyurethane film to the cured filtering material; and bonding the filtering material to the second flexible film such that the filtering material is between the first and second flexible films.

2. The method of claim 1, wherein the filtering material is applied to the first flexible film as one of a liquid and a colloid.

3. The method of claim 1, wherein the filtering material and the second flexible film are bonded together by applying at least one of an increased pressure and temperature to the filtering material and the second flexible film.

4. The method of claim 1, wherein at least one of the first and second temporary support structures is substantially transparent to wavelengths of ultraviolet light used to cure the filtering material.

5. The method of claim 1, wherein the flexible material and the second flexible film are bonded together while the first and second flexible films are being held between first and second temporary support structures.

* * * * *